S. G. HURLBUT.
Horse Hay-Rakes.
No. 156,735. Patented Nov. 10, 1874.
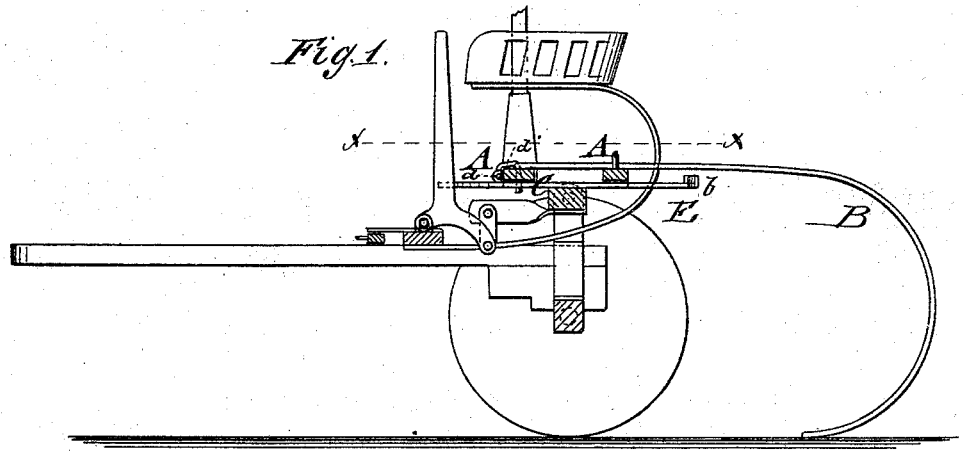
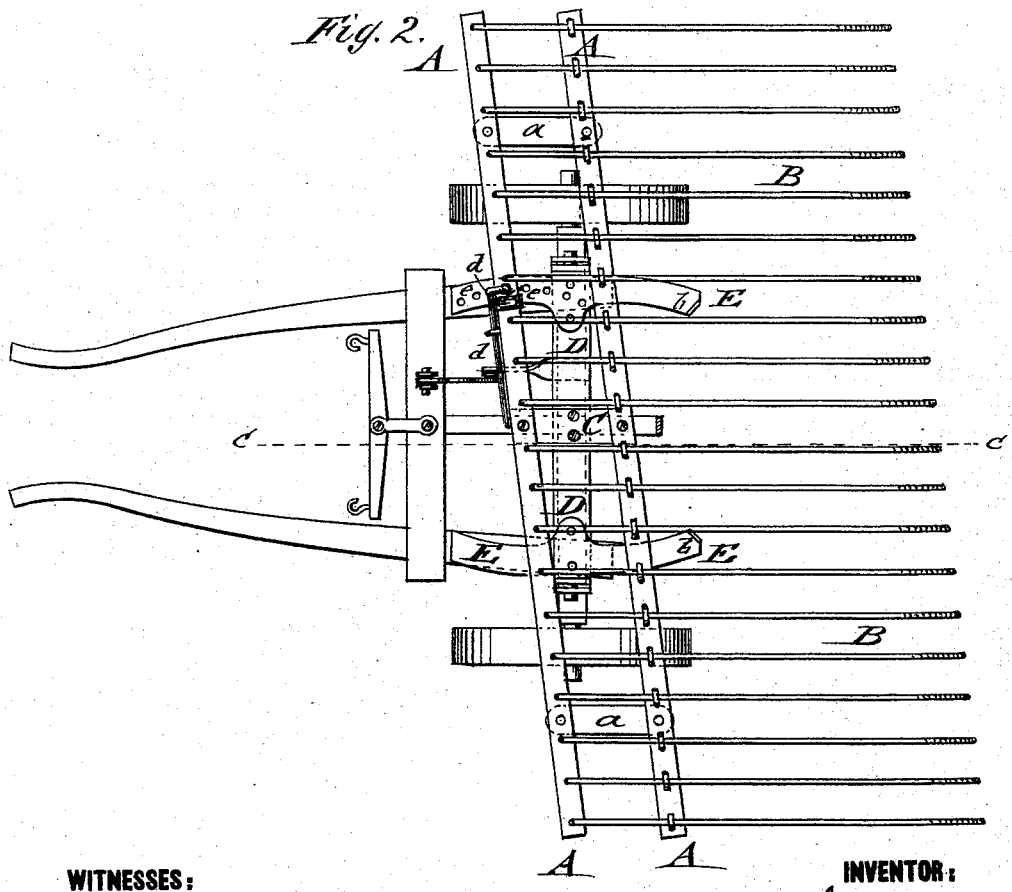
WITNESSES:
E. Wolff
A. F. Terry
INVENTOR:
S. G. Hurlbut
BY Munn & Co
ATTORNEYS.

UNITED STATES PATENT OFFICE.

SAMUEL G. HURLBUT, OF SOUTH UNION, KENTUCKY.

IMPROVEMENT IN HORSE HAY-RAKES.

Specification forming part of Letters Patent No. 156,735, dated November 10, 1874; application filed September 12, 1874.

*To all whom it may concern:*

Be it known that I, SAMUEL G. HURLBUT, of South Union, in the county of Logan and State of Kentucky, have invented a new and Improved Horse Hay-Rake, of which the following is a specification:

In the accompanying drawing, Figure 1 represents a vertical longitudinal section of my improved hay-rake on the line $c\ c$, Fig. 2; and Fig. 2 is a top view of the same, partly in section, on line $x\ x$, Fig. 1.

Similar letters of reference indicate corresponding parts.

The invention will first be fully described, and then pointed out in the claim.

In the drawing, A represents the lateral supporting-heads, to which the spring-tines B are applied, in the usual manner. The heads A are pivoted to a central plate, C, of rock-shaft D, operated by a lever mechanism, so that the tines may be raised, and the hay dumped by the driver in the usual manner, and also the teeth swung up after use. The heads A are connected by lateral pivoted plates $a$, for the purpose of retaining a parallel position to each other under whatever angle they may be thrown toward the longitudinal axis or line of draft of the rake. The rock-shaft D is provided with guide-plates E near its ends, which are firmly bolted to the same, and symmetrically extended at both sides, so that the parallel heads A may be thrown to either side of the rock-shaft. A stop-flange, $b$, at the rear end of each guide-plate E defines the angle of greatest inclination of heads and rock shaft, while a spring-pin, $d$, and hand-lever $d'$, operated by the driver, locks in perforations $e$, of guide-plates E, and secures thereby the heads and tines at any suitable angle to the rock-shaft. The receding position of the rake-teeth will roll or slide the hay to one side, and deposit the same in a continuous windrow sidewise of the outermost teeth. The supporting-heads are extended at both sides beyond the wheels of the rake, giving thereby not only a wider sweep of the teeth, but also a freer motion, and more complete control of the same. The teeth are also made longer, with greater height for the hay to roll in, without danger of clogging the rake, accomplishing thereby, and by the ready adjustability of the teeth, its work with greater efficacy and dispatch.

Having thus described my invention, I claim as new and desire to secure by Letters Patent—

The rock-shaft D, provided with guide-plates E E, one having an arc-row of perforations, the lever $d'$, and spring-pin $d$, combined with parallel rake-heads A A, as and for the purpose specified.

SAMUEL G. HURLBUT.

Witnesses:
   S. J. RUSSELL,
   HUGH RELNES.